Aug. 11, 1953     A. F. PARMELEE     2,648,067
HINGE STRUCTURE FOR GOGGLES

Filed Nov. 19, 1951

INVENTOR.
Alfred F. Parmelee
BY
ATTORNEY.

Patented Aug. 11, 1953

2,648,067

UNITED STATES PATENT OFFICE 2,648,067

HINGE STRUCTURE FOR GOGGLES

Alfred F. Parmelee, Kansas City, Mo., assignor to Parmelee Plastics Company, Kansas City, Mo., a corporation of Missouri Application November 19, 1951, Serial No. 257,156

6 Claims. (Cl. 2—14)

This invention has to do with eye protectors, and particularly with goggles having a specially formed lens structure, together with a pair of temple bows, the primary object being to provide a novel, strong, inexpensive hinge for connecting the temple bows to such specially formed lens.

It is the most important object of the present invention to provide hinge structure for swingably securing temple bows to an eye shield or lens of the kind having a pair of flanges in angular relation at the ends thereof, the hinge structure including parts that bear tightly against both of the flanges for presenting a rigid, simple and inexpensive construction.

Another object of the present invention is to provide in an eye shield such as disclosed in U. S. Letters Patent No. 2,513,507 of William C. Moeller, dated July 4, 1950, a simplified hinge for swingably joining the bows to the lens in a manner substantially different from that disclosed in said patent and including but a single bracket stamped or otherwise formed from an initially flat sheet of preferably metallic material.

Other objects include the provision of a hinge bracket for the aforesaid purpose that is U-shaped, presenting a pair of legs for swingably receiving the bow and a finger for attaching the same to the lens, the bight and the finger bearing tightly against the aforesaid flanges of the lens and the bight serving additionally, to present a stop for limiting the extent of outward swinging movement of the bows.

Figure 1:
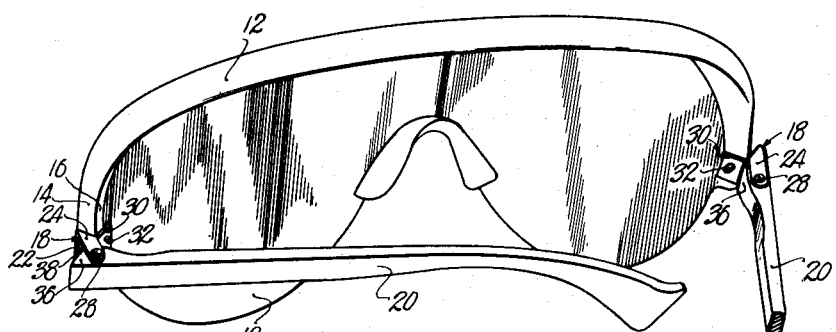
Figure 1 is a rear, perspective view of a pair of goggles showing hinge structure therefor made pursuant to the present invention.

In the drawing there is illustrated a lens 10, in the nature of an eye shield having substantially the same configuration as that disclosed in the aforesaid patent and including a brow-engaging portion 12, extending along the entire uppermost, longitudinal edge of the shield 10.

Figure 2:
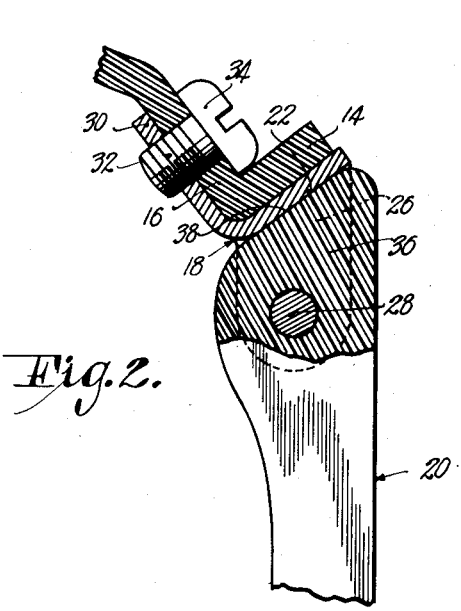
Fig. 2 is an enlarged, fragmentary, inverted plan view of one end of one of the temple bows showing the same attached to the lens, parts of the bow, the hinge and the lens being broken away and in section for clearness.

The portion 12 of the shield 10 is integral therewith and U-shaped in cross-section, merging at the ends of the shield 10 into a pair of flanges 14 and 16 that are in angular relation, and as shown in Fig. 2, substantially at right angles to each other.

Pursuant to the present invention, there is provided a hinge assembly broadly designated by the numeral 18 for swingably attaching bows 20 to the shield 10 at the flanges 14 and 16, and since the assemblies 18 are identical, only one will be described. It is to be preferred that the hinge 18 be made entirely from a sheet of metallic material that is initially flat and stamped, bent or otherwise formed to present a flat bight portion 22 that bears directly against the innermost face of the flange 14.

Figure 3:
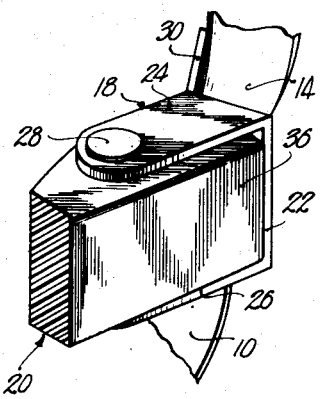
Fig. 3 is an enlarged, fragmentary, perspective view showing the outermost face of a portion of one bow attached to the lens through the medium of the hinge structure hereof.

A pair of parallel, laterally extending legs 24 and 26 receive the corresponding bow 20 therebetween, and hinge pin 28 passing through the perforated legs 24 and 26, and through the bow 20, swingably secures the latter to the legs 24 and 26. The bight 22 of hinge 18 is also provided with a laterally extending finger 30 that bears tightly against the innermost face of the flange 16. Accordingly, the angular displacement between the finger 30 and the bight 22, is substantially the same as that of the flanges 14 and 16. The hinge is secured to the lens 10 through the medium of a screw 32 that passes through the flange 16 and through the finger 30, screw 32 having a head 34 that bears flatly against the outermost face of the flange 16 in the form of my invention illustrated in Figs. 1 to 3 inclusive.

It is to be noted that the two legs 24 and 26 extend rearwardly from the flange 14 at an angle to the bight 22 with the longitudinal axes of the legs 24 and 26 in alignment with the longitudinal axes of the bows 20 when the latter are extended from the lens 10 ready for use. It is to be preferred that the bows 20 each be provided with an enlarged head 36 for receiving the hinge pin 28 and each bow 20 has an angled end 38 that bears directly against the innermost face of the bight 22 in the manner illustrated in Fig. 2 of the drawing, when the bows 20 are in the extended condition. Upon folding of the bows 20 as illustrated in Fig. 1 of the drawing, across the innermost face of the lens 10, the angled end 38 of the bows 20, moves away from the bight 22. Consequently, in addition to resting tightly against the flange 14 to present a strong and rigid structure, the bight 22 serves as a stop to limit outward swinging movement of the bows 20.

Figure 4:
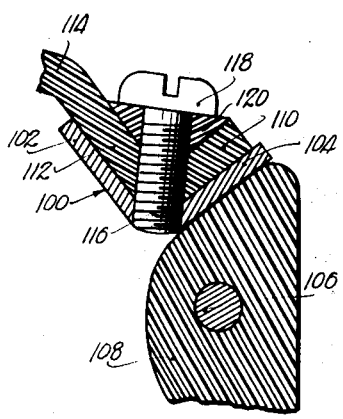
Fig. 4 is a view similar to Fig. 2 illustrating a slightly modified form of the invention.

In the modification shown by Fig. 4 of the drawing, there is provided a hinge assembly 100 substantially identical with hinge assembly 18 in that there is provided a finger 102 corresponding to finger 30, a bight 104, corresponding to bight 22, and a hinge pin 106 similar to hinge pin 28 for swingably joining bow 108 to the legs of bight 104, not shown in Fig. 4.

Flanges 110 and 112 forming a part of lens 114, fits snugly within the V-shaped configuration presented by finger 102 and bight 104 in the same manner as flanges 14 and 16 fit against the finger 30 and bight 22 of the hinge assembly 18. Rather than joining the flange 112 to the finger 102 directly, as in the case of hinge assembly 18, a screw 116 comparable to screw 32, passes through flanges 110 and 112 at the point of merger therebetween and through the finger 102 and the bight 104 at the point of merger of these last two mentioned portions of the hinge 100. Thus, to provide a flat bearing surface for head 118 of screw 116, there is provided a perforated, triangular-shaped plug 120 for receiving the screw 116 and which bears against the outermost faces of both flanges 110 and 112. It is to be preferred that the length of plug 120 be substantially the same as the width of the finger 102, or the length of bight 104.

It is obvious further, that the screws 32 and 116, may be self-tapping to facilitate the assembling operation.

In both of the modifications herein chosen for illustration, the bows 20 and 108 are swingably held in place without danger of becoming loose from the lenses 10 and 114 or otherwise maladjusted because of the relatively rigid mounting provided by the hinge structures hereinabove set forth.

Having thus described the invention what is claimed as new and desired to be secured by Letters Patent is:

1. In an eye shield, a lens having a pair of flanges in angular relation; a bracket bearing against both flanges and having a pair of legs; a temple bow between said legs; a pin joining said legs and passing through the temple bow for pivotally joining the temple bow to the bracket; and means for attaching the bracket to the lens.

2. In an eye shield, a lens having a pair of flanges in angular relation; a U-shaped bracket having a pair of legs, a bight bearing against one of said flanges, and a finger bearing against the other of said flanges; a temple bow between said legs; a pin joining said legs and passing through the temple bow for pivotally joining the temple bow to the bracket; and means for attaching the bracket to the lens.

3. In an eye shield, a lens having a pair of flanges in angular relation; a bracket bearing against both flanges and having a pair of legs and a finger; a temple bow between said legs; a pin joining said legs and passing through the temple bow for pivotally joining the temple bow to the bracket; and means on the finger for attaching the bracket to the lens.

4. In an eye shield, a lens having a pair of flanges in angular relation; a U-shaped bracket having a pair of legs, a bight bearing against one of said flanges, and a finger bearing against the other of said flanges; a temple bow between said legs; a pin joining said legs and passing through the temple bow for pivotally joining the temple bow to the bracket; and releasable means connecting the finger and said other flange for attaching the bracket to the lens.

5. In an eye shield, a lens having a pair of flanges in angular relation; a U-shaped bracket having a pair of legs, a bight bearing against one of said flanges, and a laterally extending finger on the bight and bearing against the other of said flanges; a temple bow between said legs; a pin joining said legs and passing through the temple bow for pivotally joining the temple bow to the bracket; and means for attaching the bracket to the lens, said means comprising a screw passing through the lens, and through the finger and said bight at the line of merger therebetween.

6. In an eye shield, a lens having a pair of flanges in angular relation; a U-shaped bracket having a pair of legs, a bight bearing against one of said flanges, and a laterally extending finger on the bight and bearing against the other of said flanges; a temple bow between said legs; a pin joining said legs and passing through the temple bow for pivotally joining the temple bow to the bracket; means for attaching the bracket to the lens, said means comprising a screw passing through the lens, and through the finger and said bight at the line of merger therebetween; and a plug bearing against the flanges in opposed relationship to the bracket, said screw passing through the plug and through the lens at the line of merger between the flanges.

ALFRED F. PARMELEE.

References Cited in the file of this patent

UNITED STATES PATENTS

| Number | Name | Date |
|---|---|---|
| 1,312,392 | Fook | Aug. 5, 1919 |
| 2,304,904 | Fleming | Dec. 15, 1942 |
| 2,474,119 | Rohrbach | June 21, 1949 |